July 29, 1952 — T. J. LOCKWOOD — 2,604,646
POTATO BRUSHER
Filed March 1, 1948 — 2 SHEETS—SHEET 1
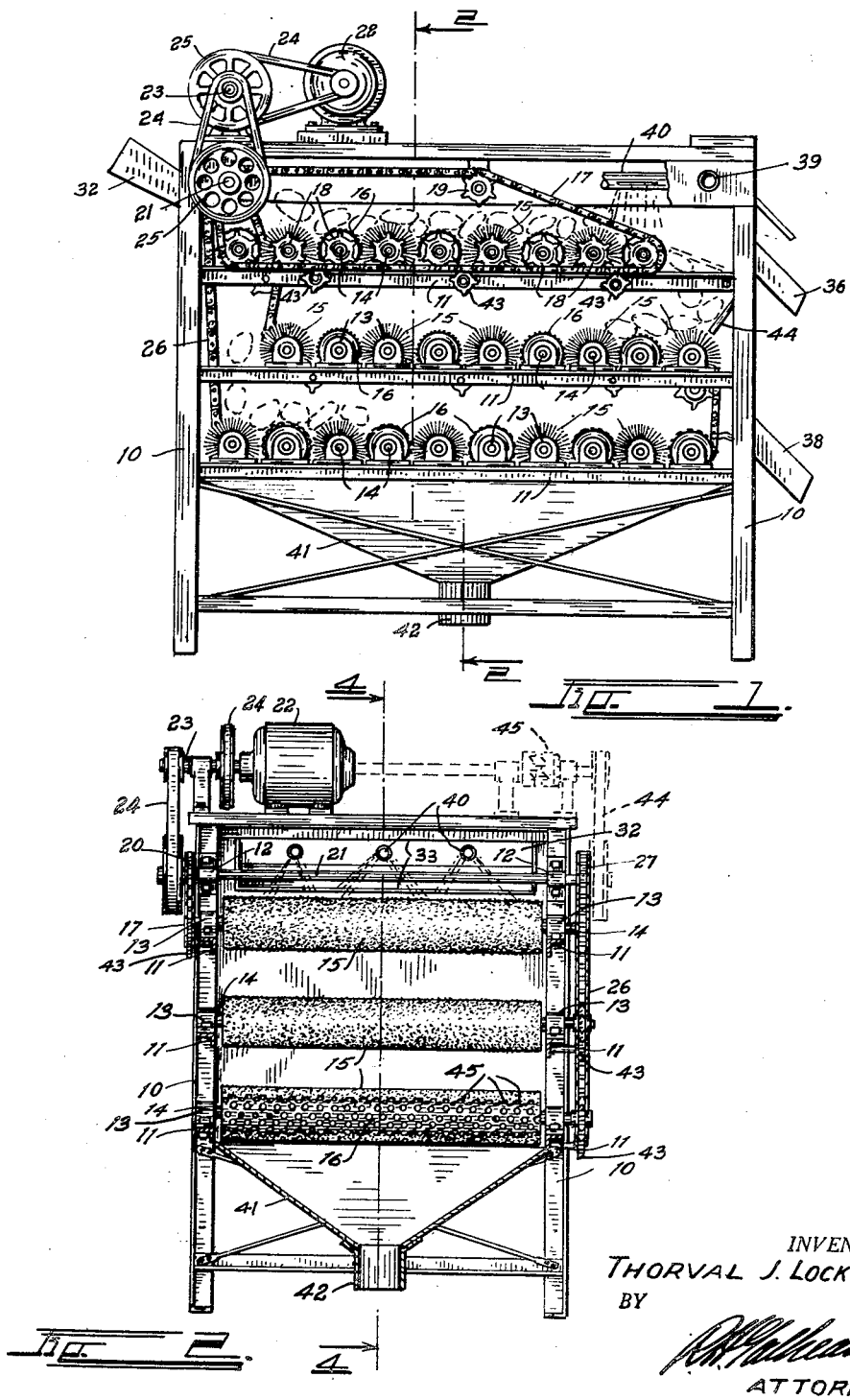
INVENTOR.
THORVAL J. LOCKWOOD.
BY
ATTORNEY.

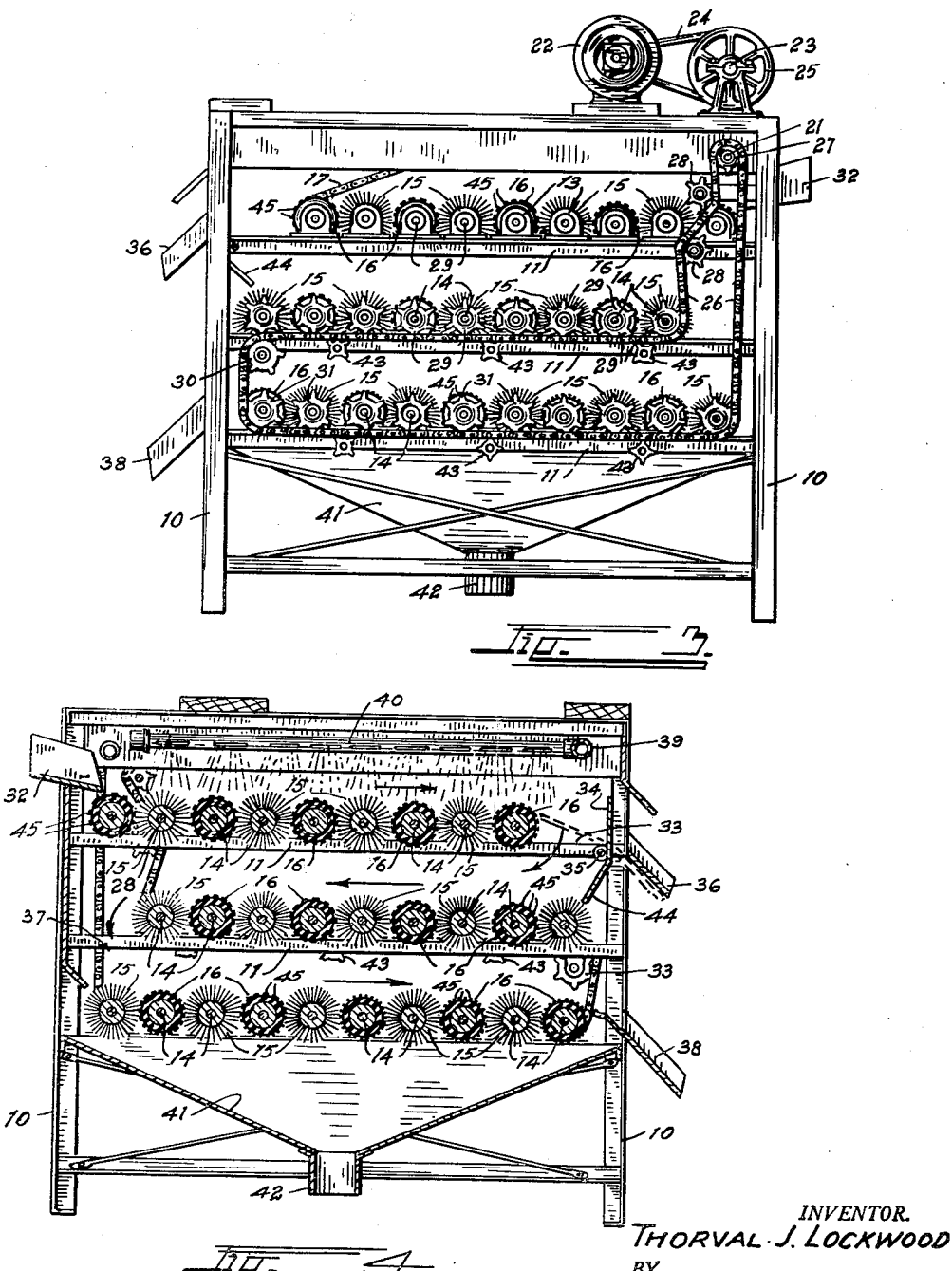

Patented July 29, 1952

2,604,646

UNITED STATES PATENT OFFICE 2,604,646

POTATO BRUSHER

Thorval J. Lockwood, Gering, Nebr.

Application March 1, 1948, Serial No. 12,220

1 Claim. (Cl. 15—3.17)

This invention relates to a potato brushing machine which may be used in a conventional potato washing machine, and has for its principal object the provision of a simple and highly efficient machine of exceedingly large capacity which will rapidly cleanse potatoes without injury to the potatoes or their jackets.

Another object of the invention is to so construct the machine to be adjustable to the condition of the potatoes, that is, it will cleanse the potatoes without the application of water should they not require wet scrubbing.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a right side elevation of the improved potato brushing machine;

Fig. 2 is a vertical, longitudinal section through the improved potato brusher, taken on the line 2—2, Fig. 1;

Fig. 3 is a left side elevation of the improved brusher; and

Fig. 4 is a longitudinal section, taken on the line 4—4, Fig. 2.

The improved brusher is supported on a suitable supporting frame provided with four corner posts 10 which support it above the floor. A plurality of horizontal bearing-supporting bars 11 extend longitudinally of the machine between each pair of corner posts 10. Each of the bars 11 carries a plurality of shaft-supporting bearings 13. As illustrated, there are three horizontal bars 11 at each side of the machine. A plurality of horizontal brush shafts 14 extend across the machine between the supporting bearings 13, each shaft carrying a cylindrical brush.

As illustrated, there are three tiers of brushes supported by the bars 11. Each tier of brushes comprises bristle brushes 15 alternating with rubber brushes 16. The brushes in the upper tier are all driven to rotate in the same direction (to the right in Fig. 1) by means of a chain 17 which travels along the lower portions of a plurality of sprocket wheels 18, there being one sprocket wheel on each of the shafts 14 of the first tier. The chain is supported against the sprocket wheels 18 by means of supporting sprockets 43. The chain 17 passes over an idler sprocket 19 and about a drive sprocket 20 upon a drive shaft 21. The drive shaft 21 is mounted in suitable bearings 12 on the posts 10 and is driven from an electric motor 22 through the medium of a counter-shaft 23 and speed reducing belts 24 and belt sheaves 25.

The two lower tiers of brushes are driven by means of a second endless chain 26 which extends about a drive sprocket 27 on the drive shaft 21; thence above idler sprockets 28; thence below shaft sprockets 29, there being one shaft sprocket 29 on each of the shafts 14 of the second tier; thence returning about an idler sprocket 30 and below a plurality of shaft sprockets 31, there being one of the sprockets 31 on each of the shafts 14 of the third tier of brushes. The chain 26 is held against the sprockets 29 by means of supporting sprockets 43 similar to the supporting sprockets used on the first chain 17.

Thus it will be seen that the upper portions of the brushes in the first and third tiers travel to the right in Fig. 4, and the brushes in the second tier travel to the left, as indicated by the arrows in the latter figure. The potatoes are fed onto the first tier of brushes from a feed chute 32, or in any other suitable manner, and are carried along in the direction of travel.

It will be noted that the brushes in the first tier terminate before the end of the frame 10 is reached, so as to leave an open space 33 through which the potatoes may drop from the last brush of the first tier to the first brush of the second tier of brushes. This open space can be controlled by means of a gate 34 hinged on a shaft 35 extending across the frame 10. The gate 34 may be swung to the broken line position of Fig. 4 to discharge the potatoes directly from the first tier of brushes to a discharge chute 36. It may also be swung to the closed or vertical solid line position of Fig. 4, where it will direct the potatoes to the second tier of brushes, the bottom portion of the gate being turned forwardly, as shown at 44, to direct the potatoes forwardly on the second tier of brushes.

When the gate 34 is closed, the potatoes return along the tops of the second tier of brushes until they reach the last brush of the second tier. The last brush is spaced from the end of the frame to leave an open space 37 through which the potatoes fall onto the first brush of the third tier of brushes. The brushes of the third tier act similarly to those of the other two tiers to carry the potatoes forwardly to a discharge chute 38 from whence they are discharged from the machine.

It is desired to call attention to the action of the bristles and brushes. The rubber rollers have comparatively rigid rubber teeth 45 which act to pick the potatoes from each bristle brush and pass them to the next bristle brush without damage. The rubber teeth 45 also turn and roll the potatoes against the bristle brushes. This allows exceedingly fine, soft bristles to be used, which ordinarily would not pick up heavy potatoes from the last preceding brush.

Should the potatoes not require much cleaning, the gate 34 can be swung to receive them from the upper tier of brushes, and they are not required to travel the full length of the other two tiers. Should the potatoes carry mud, clay, or other adhering material, washing means are provided by extending a pipe header 39 across the machine adjacent the upper extremity of one end thereof. From this header a plurality of perforated spray pipes 40 extend longitudinally over the brushes of the first tier.

The pipes 40 act to spray water upon the traveling potatoes. This spray water will gravitate through all of the tiers of brushes and collect in a collecting hopper 41 positioned at the bottom of the frame. The water from the hopper 41 may be discharged to waste through a discharge 42 or may be pumped back to the header 39 for re-use.

As described, all of the brushes rotate simultaneously, regardless of whether the potatoes are being taken off at the first chute 36 or the second chute 38. If it is desired to have the brushes of the second and third tiers remain stationary when the potatoes are being discharged from the chute 36, a separate drive chain, as indicated in broken line at 44, Fig. 2, may be used to drive the sprocket 27, and power to this second chain could be transmitted from a second motor (not shown) or through a disconnecting clutch, such as indicated in broken line at 45, Fig. 2.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A potato brushing machine comprising: a plurality of super-imposed tiers of parallel cylindrical brush members, each tier terminating short of the extremity of the next lowermost tier so that potatoes may fall from each tier onto the next lowermost tier; a drive shaft extending parallel to said brushes; a first drive sprocket on said drive shaft; a driven sprocket mounted on each brush of the first tier of brushes; an endless chain extending around said first drive sprocket and about said driven sprockets, the latter meshing with the inside of one reach of said chain so that all said sprockets will be rotated in a common direction; a second drive sprocket mounted on said drive shaft; driven sprockets mounted on the brushes of the second and third tiers of brushes; and a second endless chain extending from said second drive sprocket beneath the driven sprockets of the second and third tiers of brushes, the driven sprockets of the second tier engaging the outside of said second chain, and the sprockets of the third tier engaging the inside thereof so that the brushes in the first and third tiers will move in one direction, while the brushes of the second tier move in the opposite direction.

THORVAL J. LOCKWOOD.

REFERENCES CITED

The following references are of record in the file of this patent:

UNITED STATES PATENTS

| Number | Name | Date |
|---|---|---|
| 829,141 | Cohnen | Aug. 21, 1906 |
| 1,895,634 | Lauterbur et al. | Jan. 31, 1933 |
| 1,957,305 | Trescott | May 1, 1934 |
| 2,033,912 | Durand | Mar. 17, 1936 |
| 2,099,226 | Paxton | Nov. 16, 1937 |
| 2,196,851 | Brandenburg | Apr. 9, 1940 |
| 2,228,192 | Arthur | Jan. 7, 1941 |
| 2,286,393 | Thomas | June 16, 1942 |
| 2,378,418 | Lister | June 19, 1945 |